(12) United States Patent
Woltman et al.

(10) Patent No.: US 9,989,763 B2
(45) Date of Patent: Jun. 5, 2018

(54) IMAGING USING MULTIPLE DIFFERENT NARROW BANDS OF LIGHT HAVING RESPECTIVE DIFFERENT EMISSION PEAKS

(71) Applicant: Microsoft Technology Licensing, LLC, Redmond, WA (US)

(72) Inventors: Scott Woltman, Lynnwood, WA (US); Eliezer Glik, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 216 days.

(21) Appl. No.: 14/959,832

(22) Filed: Dec. 4, 2015

(65) Prior Publication Data
US 2017/0160548 A1 Jun. 8, 2017

(51) Int. Cl.
*G02B 21/20* (2006.01)
*G02B 27/00* (2006.01)
(Continued)

(52) U.S. Cl.
CPC ..... *G02B 27/0172* (2013.01); *G02B 27/0081* (2013.01); *G02B 27/4205* (2013.01);
(Continued)

(58) Field of Classification Search
CPC ...... G02B 5/18; G02B 5/1814; G02B 5/1828; G02B 5/1842; G02B 26/008;
(Continued)

(56) References Cited

U.S. PATENT DOCUMENTS 5,664,032 A 9/1997 Bischel et al.
7,418,170 B2 8/2008 Mukawa et al.
(Continued)

FOREIGN PATENT DOCUMENTS

EP 2733517 A1 5/2014
JP H10223976 A 8/1998
(Continued)

OTHER PUBLICATIONS

International Search Report and Written Opinion dated Feb. 10, 2017 in PCT Application No. PCT/US2016/063743.
(Continued)

*Primary Examiner* — Stephone B Allen
*Assistant Examiner* — Ryan S Dunning
(74) *Attorney, Agent, or Firm* — Arent Fox LLP

(57) ABSTRACT

A near eye or heads up display system includes at least one light source, an imaging device, and an optical structure. The at least one light source can be, e.g., a red light source that produces light within a red wavelength range that has at least two different narrow bands of light having respective different emission peaks. The imaging device produces an image using light produced by the light source(s). The optical structure is configured to transfer light corresponding to the image from an input-pupil to an output-pupil where the image is viewable. By producing at least two different narrow bands of light having respective different emission peaks within a color (e.g., red) wavelength range, and taking advantage of chromatic dispersion, a more uniform intensity distribution is provided in the viewable image compared to if only one narrow band of light within the color wavelength range were produced.

20 Claims, 7 Drawing Sheets

(51) Int. Cl.
*G02B 27/01* (2006.01)
*G02B 27/42* (2006.01)
*G03B 21/20* (2006.01)
G02B 5/18 (2006.01)
G02B 27/09 (2006.01)

(52) U.S. Cl.
CPC .............. *G03B 21/204* (2013.01); *G02B 5/18* (2013.01); *G02B 5/1828* (2013.01); *G02B 5/1842* (2013.01); *G02B 27/0037* (2013.01); *G02B 27/0056* (2013.01); *G02B 27/0944* (2013.01); *G02B 2027/0112* (2013.01); *G02B 2027/0118* (2013.01); *G02B 2027/0123* (2013.01); *G02B 2027/0178* (2013.01)

(58) Field of Classification Search
CPC ............ G02B 27/0037; G02B 27/0056; G02B 27/0081; G02B 27/0112; G02B 2027/0118; G02B 2027/0123; G02B 2027/0172; G02B 27/0178; G02B 27/0944; G02B 27/0972; G02B 27/4205; G02B 27/44; G03B 21/204
USPC ...................... 359/34, 567, 569; 385/37, 146
See application file for complete search history.

(56) References Cited

U.S. PATENT DOCUMENTS

| | | | |
|---|---|---|---|
| 7,686,493 B2 | 3/2010 | Roshan et al. | |
| 7,710,645 B2 | 5/2010 | Lippey | |
| 7,728,968 B2 | 6/2010 | Tsai et al. | |
| 8,355,610 B2 | 1/2013 | Simmonds | |
| 8,553,337 B2 | 10/2013 | Webb et al. | |
| 8,736,964 B2 | 5/2014 | Imahori et al. | |
| 8,873,149 B2 | 10/2014 | Bohn et al. | |
| 2008/0123703 A1 | 5/2008 | Mohrdiek et al. | |
| 2011/0134017 A1 | 6/2011 | Burke | |
| 2012/0119978 A1* | 5/2012 | Border | G02B 27/0172 345/8 |
| 2013/0063815 A1* | 3/2013 | Kubota | G02B 27/44 359/464 |
| 2013/0100362 A1 | 4/2013 | Saeedi et al. | |
| 2013/0314789 A1* | 11/2013 | Saarikko | G02B 27/0081 359/489.07 |
| 2014/0140653 A1 | 5/2014 | Brown et al. | |
| 2015/0002528 A1 | 1/2015 | Bohn et al. | |
| 2015/0103404 A1 | 4/2015 | Rudy et al. | |

FOREIGN PATENT DOCUMENTS

| | | |
|---|---|---|
| WO | 2013033274 A1 | 3/2013 |
| WO | 2014155288 A2 | 10/2014 |

OTHER PUBLICATIONS

Riaud, et al., "Limitation of the Pupil Replication Technique in the Presence of Instrumental Defects", In Astrophysical Journal, vol. 628, Issue 1, Jul. 2005, 14 pages.

Das, et al., "Tunable Narrow Band THz Wave Generation from Laser Induced Gas Plasma", In Journal of Optics Press, vol. 18, No. 7, Mar. 29, 2010, 9 pages.

Spaan, et al., "Analysis of Pupil Replication", The Astrophysical Journal, Apr. 1, 2007, pp. 1380-1385.

* cited by examiner

IMAGING USING MULTIPLE DIFFERENT NARROW BANDS OF LIGHT HAVING RESPECTIVE DIFFERENT EMISSION PEAKS

BACKGROUND

Various types of computing, entertainment, and/or mobile devices can be implemented with a transparent or semi-transparent display through which a user of a device can view the surrounding environment. Such devices, which can be referred to as see-through, mixed reality display device systems, or as augmented reality (AR) systems, enable a user to see through the transparent or semi-transparent display of a device to view the surrounding environment, and also see images of virtual objects (e.g., text, graphics, video, etc.) that are generated for display to appear as a part of, and/or overlaid upon, the surrounding environment. These devices, which can be implemented as head-mounted display (HMD) glasses or other wearable near eye display devices, but are not limited thereto, often utilize optical waveguides to replicate an image, e.g., produced by a display engine, to a location where a user of a device can view the image as a virtual image in an augmented reality environment. As this is still an emerging technology, there are certain challenges associated with utilizing waveguides and/or other optical structures to display images of virtual objects to a user.

SUMMARY

Certain embodiments described herein relate to a near eye or heads up display system that includes a light source assembly, an imaging device, and an optical structure. The light source assembly can include, e.g., red, green and/or blue light sources that are configured to respectively produce red light within a corresponding red wavelength range, green light within a corresponding green wavelength range and/or blue light within a corresponding blue wavelength range. The imaging device can be configured to produce an image using the light produced by the light source assembly. For example, the imaging device can be configured to produce an image using red, green and blue light produced by the light source assembly. The optical structure can include one or more diffractive optical elements (DOEs) and be configured to transfer light corresponding to the image from an input-pupil to an output-pupil where the image can be viewed by a human eye. In accordance with specific embodiments, at least one of the red, green or blue light sources is configured to produce at least two different narrow bands of light that have respective different emission peaks that are within the corresponding wavelength range for the light source. For reasons that will be explained below, by taking advantage of chromatic dispersion effects, this provides for a more uniform intensity distribution in the viewable image, compared to if only one narrow band of light within the wavelength range for the light source were produced.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
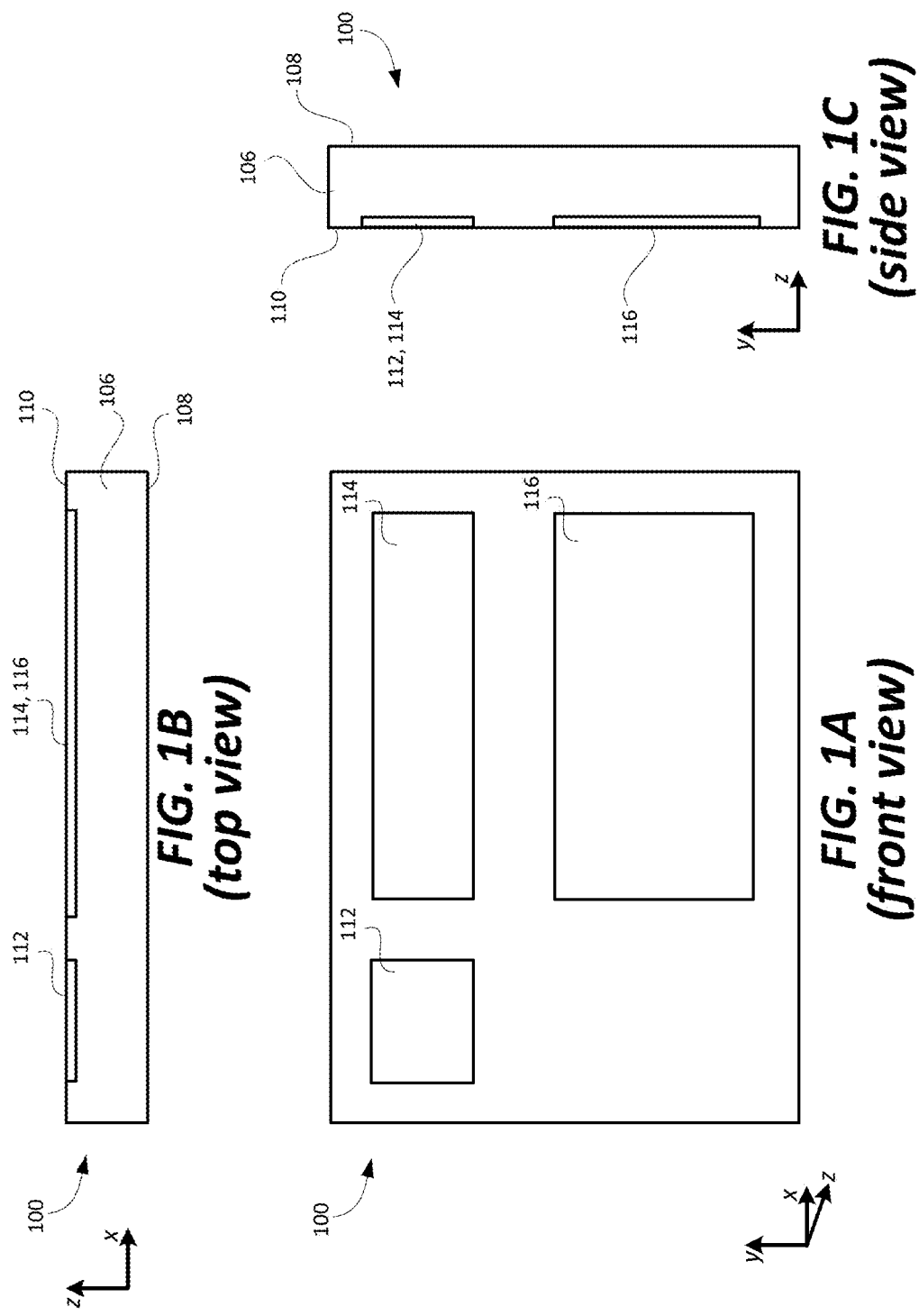
FIGS. 1A, 1B and 1C are front, top and side views, respectively, of an exemplary waveguide that can be used to replicate an image associated with an input-pupil to an expanded output-pupil.

Certain embodiments of the present technology relate to a near eye or heads up display system that includes a light source assembly, an imaging device, and a chromatically dispersive optical structure. The light source assembly can include, e.g., red, green and/or blue light sources that are configured to respectively produce red light within a corresponding red wavelength range, green light within a corresponding green wavelength range and blue light within a corresponding blue wavelength range. For a more specific example, a red light source can produce light within a red wavelength range (from 600 nm to 650 nm) that has at least two different narrow bands of light that have respective different emission peaks. The imaging device can produce an image using light produced by the light source. The optical structure (e.g., a waveguide including one or more diffractive optical elements) can transfer light corresponding to the image from an input-pupil to an output-pupil, where the image can be viewed. The light source, by producing at least two different narrow bands of light that have respective different emission peaks, provides for a more uniform intensity distribution in the viewable image compared to if only one narrow band of light within the wavelength range for the light source were produced.

In the description that follows, like numerals or reference designators will be used to refer to like parts or elements throughout. In addition, the first digit of a three digit reference number, or the first two digits of a four digit reference number, identifies the drawing in which the reference number first appears.

FIGS. 1A, 1B and 1C are front, top and side views, respectively, of exemplary planar optical waveguide 100 that can be used to replicate an image associated with an input-pupil to an expanded output-pupil. The term "input-pupil," as used herein, refers to an aperture through which light corresponding to an image is overlaid on an input-coupler of a waveguide. The term "output-pupil," as used herein, refers to an aperture through which light corresponding to an image exits an output-coupler of a waveguide. The planar optical waveguide 100 will often be referred to hereafter more succinctly simply as an optical waveguide 100, or even more succinctly as a waveguide 100. As will be discussed in further detail below with reference to FIG. 2, the image that the waveguide 100 is being used to replicate, and likely also expand, can be generated using a display engine that includes a light source assembly and an imaging device.

Referring to FIGS. 1A, 1B and 1C, the planar optical waveguide 100 includes a bulk-substrate 106 having an input-coupler 112 and an output-coupler 116. The input-coupler 112 is configured to couple light corresponding to an image associated with an input-pupil into the bulk-substrate 106 of the waveguide. The output-coupler 116 is configured to couple the light corresponding to the image associated with the input-pupil, which travels in the planar optical waveguide 100 from the input-coupler 112 to the output-coupler 116, out of the waveguide 100 so that the light is output and imaged from the output-pupil.

The bulk-substrate 106, which can be made of glass or optical plastic, but is not limited thereto, includes a first major planar surface 108 and a second major planar surface 110 opposite and parallel to the first major planar surface 108. The first major planar surface 108 can alternatively be referred to as the front-side major surface 108 (or more simply the front-side surface 108), and the second major planar surface 110 can alternatively be referred to as the back-side major surface 110 (or more simply the back-side surface 110). As the term "bulk" is used herein, a substrate is considered to be "bulk" substrate where the thickness of the substrate (between its major surfaces) is at least ten times (i.e., 10×) the wavelength of the light for which the substrate is being used as an optical transmission medium. For an example, where the light (for which the substrate is being used as an optical transmission medium) is red light having a wavelength of 620 nm, the substrate will be considered a bulk-substrate where the thickness of the substrate (between its major surfaces) is at least 6200 nm, i.e., at least 6.2 µm. In accordance with certain embodiments, the bulk-substrate 106 has a thickness of at least 25 µm between its major planar surfaces 108 and 110. In specific embodiments, the bulk-substrate 106 has a thickness (between its major surfaces) within a range of 25 µm to 1000 µm. The bulk-substrate 106, and more generally the waveguide 100, is transparent, meaning that it allows light to pass through it so that a user can see through the waveguide 100 and observe objects on an opposite side of the waveguide 100 than the user's eye(s).

The planar optical waveguide 100 in FIGS. 1A, 1B and 1C is also shown as including an intermediate-component 114, which can alternatively be referred to as an intermediate-zone 114. Where the waveguide 100 includes the intermediate-component 114, the input-coupler 112 is configured to couple light into the waveguide 100 (and more specifically, into the bulk-substrate 106 of the waveguide 100) and in a direction of the intermediate-component 114. The intermediate-component 114 is configured to redirect such light in a direction of the output-coupler 116. Further, the intermediate-component 114 is configured to perform one of horizontal or vertical pupil expansion, and the output-coupler 116 is configured to perform the other one of horizontal or vertical pupil expansion. For example, the intermediate-component 114 can be configured to perform horizontal pupil expansion, and the output-coupler 116 can be configured to vertical pupil expansion. Alternatively, if the intermediate-component 114 were repositioned, e.g., to be below the input-coupler 112 and to the left of the output-coupler 116 shown in FIG. 1A, then the intermediate-component 114 can be configured to perform vertical pupil expansion, and the output-coupler 116 can be configured to perform horizontal pupil expansion. Such pupil expansion provides for an increased eye box, compared to if pupil expansion were not performed, thereby making the embodiments described herein practical for use in a near eye or heads up display. In certain embodiments, the intermediate-component is configured as a fold-grating. In other embodiments, the intermediate-component is a mirror based component, rather than a grating based component.

The input-coupler 112, the intermediate-component 114 and the output-coupler 116 can be referred to collectively herein as optical components 112, 114 and 116 of the waveguide, or more succinctly as components 112, 114 and 116.

It is possible that a waveguide includes an input-coupler and an output-coupler, without including an intermediate-components. In such embodiments, the input-coupler would be configured to couple light into the waveguide and in a direction toward the output-coupler. In such embodiments, the output-coupler can provide one of horizontal or vertical pupil expansion, depending upon implementation.

In FIG. 1A, the input-coupler 112, the intermediate-component 114 and the output-coupler 116 are shown as having rectangular outer peripheral shapes, but can have alternative outer peripheral shapes. For example, the input-coupler 112 can alternatively have a circular outer peripheral shape, but is not limited thereto. For another example, the intermediate-component can have a triangular or hexagonal outer peripheral shape, but is not limited thereto. Further, it is noted that the corners of each of the peripheral shapes, e.g., where generally rectangular or triangular, can be chamfered or rounded, but are not limited thereto. These are just a few exemplary outer peripheral shapes for the input-coupler 112, the intermediate-component 114 and the output-coupler 116, which are not intended to be all encompassing.

Figure 10:
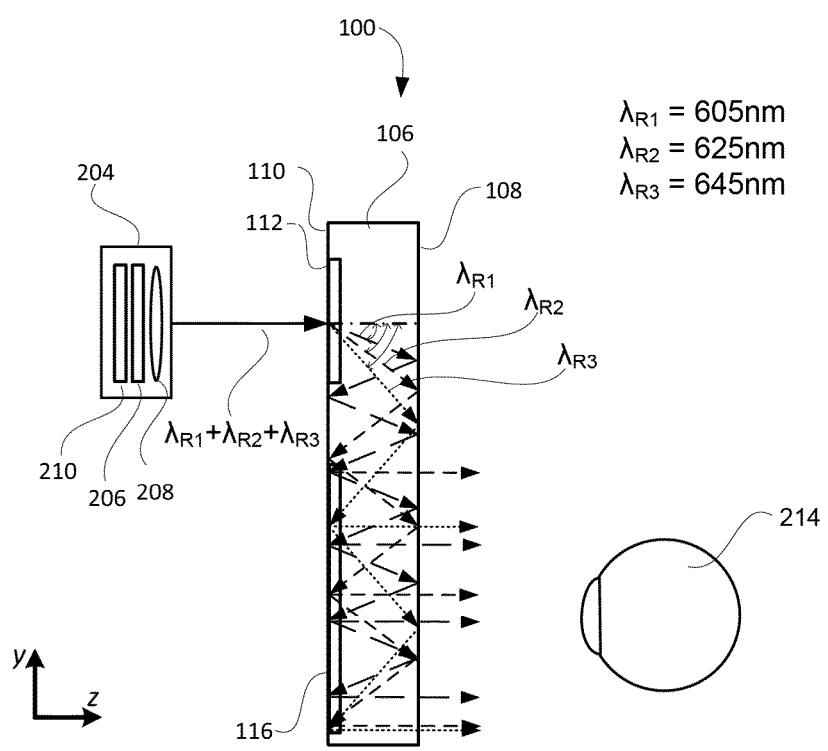
FIG. 10, which is similar to FIG. 2, is used to explain how certain embodiments of the present technology utilize narrowband light sources in a manner that improves pupil overlap and output-pupil fill.

As can best be appreciated from FIGS. 1B and 10, the input-coupler 112, the intermediate-component 114 and the output-coupler 116 are all shown as being provided in or on a same surface (i.e., the back-side surface 110) of the waveguide 100. In such a case, the input-coupler 112 can be transmissive (e.g., a transmission grating), the intermediate-component 114 can be reflective (e.g., a reflective grating), and the output-coupler 116 can also be reflective (e.g., a further reflective grating). The input-coupler 112, the intermediate-component 114 and the output-coupler 116 can alternatively all be provided in the front-side surface 110 of the waveguide 100. In such a case, the input-coupler 112 can be reflective (e.g., a reflective grating), the intermediate-component 114 can be reflective (e.g., a further reflective grating), and the output-coupler 116 can also be transmissive (e.g., a transmission grating).

Alternatively, the input-coupler 112, the intermediate-component 114 and the output-coupler 116 can all be embedded (also referred to as immersed) in the bulk-substrate 106. For example, the bulk-substrate 106 can be separated into two halves (that are parallel to the major surfaces 108 and 110), and the input-coupler 112, the intermediate-component 114 and the output-coupler 116 can be provided in (e.g., etched into) one of the inner surfaces of the two halves, and the inner surfaces of the two halves can be adhered to one another. Alternatively, the bulk-substrate 106 can be separated into two halves (that are parallel to the major surfaces 108 and 110), and the input-coupler 112, the intermediate-component 114 and the output-coupler 116 can be provided between the inner surfaces of the two halves. Other implementations for embedding the input-coupler 112, the intermediate-component 114 and the output-coupler 116 in the bulk-substrate 106 are also possible, and within the scope of the embodiments described herein. It is also possible that one of the input-coupler 112, the intermediate-component 114 and the output-coupler 116 is provided in or on the front-side surface 108 of the waveguide 108, another one of the components 112, 114 and 116 is provided in or on the back-side surface 110, and the last one of the components 112, 114 and 116 is embedded or immersed in the bulk-substrate 106. More generally, unless stated otherwise, any individual one of the input-coupler 112, the intermediate-component 114 and the output-coupler 116 can be provided in or on either one of the major planar surfaces 108 or 110 of the bulk-substrate 106, or embedded therebetween.

The input-coupler 112, the intermediate-component 114 and the output-coupler 116 can each be implemented as a diffraction grating, or more generally, as a diffractive optical element (DOE). Such DOEs can be produced using holographic processes, in which case, the DOEs can be more specifically referred to a holographic optical elements (HOEs). The input-coupler 112 can alternatively be implemented as a prism, a reflective polarizer or can be mirror based. Similarly, the output-coupler 116 can alternatively be implemented as a prism, a reflective polarizer or can be mirror based. Depending upon the specific configuration and implementation, any one of the input-coupler 112, the intermediate-component 114 and the output-coupler 116 can be reflective, diffractive or refractive, or a combination thereof, and can be implemented, e.g., as a linear grating type of coupler, a holographic grating type of coupler, a prism or another type of optical coupler. The intermediate-component 114, as noted above, can be implemented using a fold-grating, or can alternatively be implemented as a mirror based pupil expander, but is not limited thereto.

Where the input-coupler 112, the intermediate-component 114 and the output-coupler 116 are implemented in or on one (or both) of the surfaces 108 and/or 110 of the waveguide 100, one or more of them can be implemented as a surface grating, or more specifically, as a surface relief grating (SRG). A surface grating is a periodic structure in or on the surface of an optical component, such as a bulk-substrate 106. When the periodic structure is due to modulation of the surface itself, or a coating on the surface, it is referred to as a surface relief grating (SRG). An exemplary SRG includes uniform straight grooves in or on a surface of an optical component that are separated by uniform straight groove spacing regions. The nature of the diffraction by an SRG depends both on the wavelength of light incident on the grating and various optical characteristics of the SRG, such as line spacing, groove depth and groove slant angle. An SRG can be fabricated by way of a suitable microfabrication process, which may involve etching of and/or deposition on a substrate (e.g., the bulk-substrate 106) to fabricate a desired periodic microstructure in or on the substrate to form an optical component, which may then be used as a production master such as a mold or mask for manufacturing further optical components. An SRG is an example of a Diffractive Optical Element (DOE). The input-coupler 112 and the output-coupler 116 can alternatively each be implemented as a prism, which will also cause the chromatic dispersion effect that is taken advantage of by specific embodiments described herein. Other types of couplers that cause chromatic dispersion can alternatively be used to couple light corresponding to an image into and out of an optical waveguide or other optical structure.

Where the input-coupler 112, the intermediate-component 114 and/or the output-coupler 116 is an SRG, each such SRG can be etched into one of the major planar surfaces 108 or 110 of the bulk-substrate 106. In such embodiments, the SRG can be said to be formed "in" the bulk-substrate 106. Alternatively, each SRG can be physically formed in a coating that covers one of the major planar surfaces 108 or 110 of the bulk-substrate 106, in which case each such SRG can be said to be formed "on" the bulk-substrate 106. Either way, the components 112, 114 and 116 are considered parts of the waveguide 100.

Referring specifically to FIG. 1A, in an exemplary embodiment, the input-coupler 112 can have surface gratings that extend in a vertical (y) direction, the output-coupler 116 can have surface gratings that extend in a horizontal (x) direction, and the intermediate-component 114 can have surface gratings that extend diagonal (e.g., ~45 degrees) relative to the horizontal and vertical directions. This is just an example. Other variations are also possible and within the scope of embodiments of the present technology.

More generally, the input-coupler 112, the intermediate-component 114 and the output-coupler 116 can have various different outer peripheral geometries, can be provided in or on either of the major planar surfaces of the bulk-substrate, or can be embedded in the bulk-substrate 106, and can be implemented using various different types of optical structures, as can be appreciated from the above discussion, and will further be appreciated from the discussion below.

In general, light corresponding to an image, which is coupled into the waveguide via the input-coupler 112, can travel through the waveguide from the input-coupler 112 to the output-coupler 114, by way of total internal refection (TIR). TIR is a phenomenon which occurs when a propagating light wave strikes a medium boundary (e.g., of the bulk-substrate 106) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta_c$ the critical angle for two optical mediums (e.g., the bulk-substrate 106, and air or some other medium that is adjacent to the bulk-substrate 106) that meet at a medium boundary, n1 is the index of refraction of the optical medium in which light is traveling towards the medium boundary (e.g., the bulk-substrate 106, once the light is couple therein), and n2 is the index of refraction of the optical medium beyond the medium boundary (e.g., air or some other medium adjacent to the bulk-substrate 106).

The concept of light traveling through the waveguide 100, from the input-coupler 112 to the output-coupler 114, by way of TIR, can be better appreciated from FIG. 2, which will now be discussed. Referring to FIG. 2, a side view of an exemplary display system 200 is shown therein. The display system 200 is shown as including the waveguide 100 (introduced with reference to FIGS. 1A, 1B and 1C) and a display engine 204 that generates an image including angular content that is coupled into the waveguide 100 by the input-coupler 112. FIG. 2 also shows a human eye 214 that is viewing the image (as a virtual image) within an eye box that is proximate the output-coupler 116. Explained another way, the human eye 214 is viewing the image from an output-pupil associated with the waveguide 100. The display 200 can be, e.g., a near eye display or a heads up display. The display engine 204 can include, e.g., an imaging device 206 (also known as an image former), an imaging lens 208 and a light source assembly 210 (also known as an illuminator 210), but is not limited thereto.

The imaging device 206 can be implemented using a transmissive projection technology where a light source is modulated by an optically active material, and backlit with white light. These technologies are usually implemented using liquid crystal display (LCD) type displays with powerful backlights and high optical energy densities. The light source assembly 210 can provide the aforementioned backlighting. The imaging device 206 can also be implemented using a reflective technology for which external light is reflected and modulated by an optically active material. Digital light processing (DLP), liquid crystal on silicon (LCOS), scanning MEMs (Microelectromechanical systems) display technology, and Mirasol® display technology from Qualcomm, Inc. are all examples of reflective technologies. The imaging device 206, alone or in combination with the light source assembly 210, can also be referred to as a micro display. The imaging lens 208 is arranged to receive a display image from the imaging device 206, to collimate and project the display image at a given defined field of view, and to form a pupil at the location of the input-coupler 112 of the waveguide 100. In accordance with an embodiment, an input-pupil associated with the waveguide may be approximately the same size as an output-pupil associated with the display engine 204, e.g., 5 mm or less in some embodiments, but is not limited thereto.

FIG. 2 is not intended illustrate the precise locations of the light source assembly 210 relative to the imaging device 206. Rather, FIG. 2 is intended to illustrate that the imaging device 206 utilizes light, generated by the light source assembly 210, to produce an image. For example, various optical elements, such as lenses, mirrors, birdbath optics and/or beam splitters may be included in the display engine 204 to cause light that is produced by the light source assembly 210 to be reflected off an image generating component (e.g., a LCOS display element, DLP display element or a scanning MEMs micro-scanning mirror element) of the imaging device 206. Regardless of the exact configuration, eventually light associated with the image is caused to be incident on the input-coupler 112 of the waveguide 100, so that the light associated with the image can travel, by way of total internal reflection (TIR), from the input-coupler 112 to the output-coupler 116, where the light is output and imaged from an output-pupil by a human eye.

As noted above in the discussion of FIGS. 1A-1C, the waveguide 100 can optionally include an intermediate-component 114 that performs one of horizontal and vertical pupil expansion, and the output-coupler 116 can perform the other one of horizontal or vertical pupil expansion.

In FIG. 2, the display engine 204 is shown as facing the back-side surface 110 of the waveguide 100, and the eye 214 is shown as facing the front-side surface 108 opposite and parallel to the back-side surface 110. This provides for a periscope type of configuration in which light enters the waveguide on one side of the waveguide 100, and exits the waveguide at an opposite side of the waveguide 100. Alternatively, the input-coupler 112 and the output-coupler 116 can be implemented in a manner such that the display engine 204 and the eye 214 are proximate to and face a same major planar surface (108 or 110).

The waveguide 100 can be incorporated into a see-through mixed reality display device system, but is not limited to use therewith. A separate instance of the waveguide 100 and the display engine 204 can be provided for each of the left and right eyes of a user. In certain embodiments, such waveguide(s) 100 may be positioned next to or between see-through lenses, which may be standard lenses used in eye glasses and can be made to any prescription (including no prescription). Where a see-through mixed reality display device system is implemented as head-mounted display (HMD) glasses including a frame, the display engine 204 can be located to the side of the frame so that it sits near to a user's temple. Alternatively, the display engine 204 can be located in a central portion of the HMD glasses that rests above a nose bridge of a user. Other locations for the display engine 204 are also possible. In these instances, the user can also be referred to as a wearer. Where there is a separate waveguide for each of the left and right eyes of a user, there can be a separate display engine for each of the waveguides, and thus, for each of the left and right eyes of the user. One or more further adjacent waveguides can be used to perform eye tracking based on infrared light that is incident on and reflected from the user's eye(s) 214, as is known in the art. In certain embodiments, a separate waveguide is provided for each separate color (e.g., red, green and blue) that is used to produce image. In such embodiments, three waveguides (used for separately guiding red, green and blue light corresponding to an image) can be stacked, back-to-back, to provide a waveguide assembly. Such a waveguide assembly, or individual waveguides thereof, are examples of optical structures that are configured to utilize total internal reflection (TIR) to transfer light corresponding to an image from an input-pupil to an output-pupil where the image can be viewed by a human eye. As explained above, such waveguides can also be used to provide pupil expansion.

The light source assembly 210 can include red, green and/or blue light sources that are configured to respectively produce red light within a corresponding red wavelength range, green light within a corresponding green wavelength range and blue light within a corresponding blue wavelength range. For example, the light source assembly 210 can include wideband red, green and blue light emitting diode (LEDs). Wideband, as the term is used herein, refers to light having a full width at half maximum (FWHM) bandwidth that is greater than 10 nm, and is likely to have an FWHM bandwidth of at least 30 nm.

Figure 3:
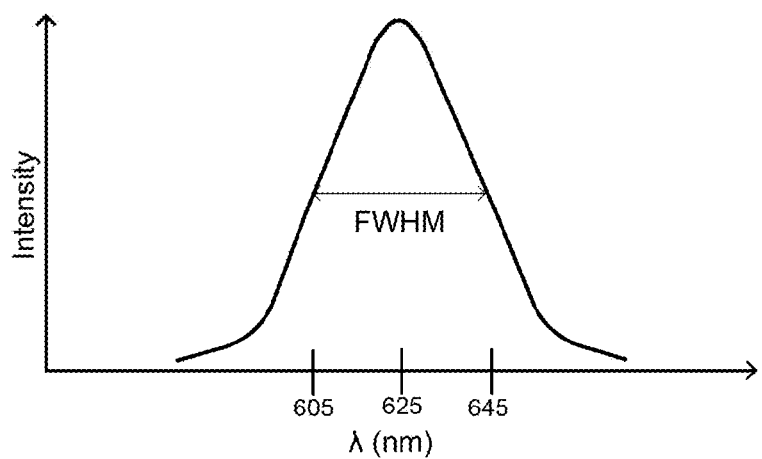
FIG. 3 is a graph that illustrates the spectral characteristics of light emitted by an exemplary wideband red light emitting diode (LED).

A wideband red LED can, for example, have a FWHM bandwidth from ~605 nm to ~645 nm, with an emission peak at ~625 nm. The spectral characteristics of red light emitted by such an exemplary wideband red LED is illustrated in the graph of FIG. 3. A wideband green LED can, for example have a FWHM bandwidth from ~505 nm to ~545 nm, with an emission peak at ~525 nm. A graph of the spectral characteristics of green light emitted by such a wideband green LED could resemble the graph in FIG. 3, but with the emission peak shifted down to ~525 nm. A wideband blue LED can, for example, have a FWHM bandwidth from ~435 nm to ~475 nm, with an emission peak at ~455 nm. A graph of the spectral characteristics of blue light emitted by such a wideband blue LED could resemble the graph in FIG. 3, but with the emission peak shifted down to ~455 nm. These are just examples, which are not intended to be limiting.

While wideband LEDs are relatively inexpensive and readily available, there are certain benefits to using narrowband light sources, such as narrowband laser diodes (LDs), instead of wideband LEDs. For example, narrowband LDs produce more collimated and coherent light than wideband LEDs, can provide higher output power than wideband LEDs, can produce linearly polarized light, and may enable better optimization of an overall imaging system. Narrowband, as the term is used herein, refers to light having a FWHM bandwidth that is less than 10 nm, and is likely to have an FWHM bandwidth of less than 5 nm (e.g., 2 nm or less). Additionally, certain types of display technology, such as MEMs scanning display technology, require that narrowband light sources be used. Further, narrowband light sources can be integrated into assemblies that typically weigh less than those required for the integration of wideband LEDs, which is advantageous where the light sources are included in a portable device. Also, where a narrrowband LD produces linearly polarized light, such light can provide for a higher coupling efficiency when a DOE or other coupler is configured to have a preferential polarization state.

Figure 4:
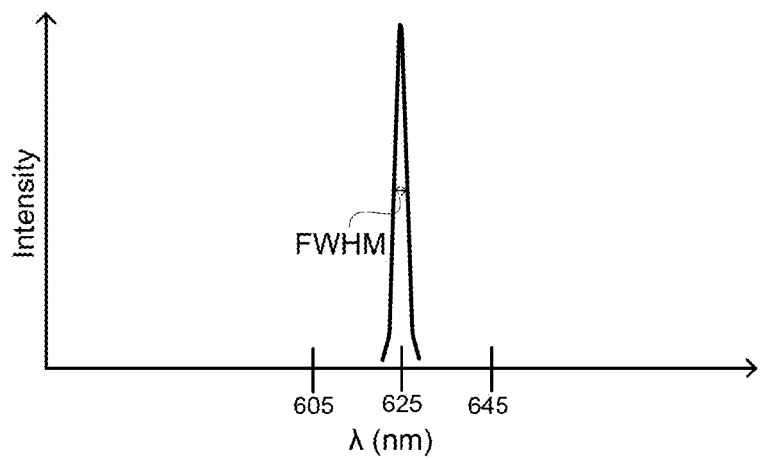
FIG. 4 is a graph that illustrates the spectral characteristics of light emitted by an exemplary narrowband red light diode (LD).

A narrowband light source can include, e.g., a laser diode (LD), a super luminescent light emitting diode (SLED), or a quantum dot light emitting diode (QD-LED), or some other light emitter element that emits light having a FWHM bandwidth that is less than 10 nm. A graph of the spectral characteristics of red light emitted by an exemplary narrowband red LD is shown in FIG. 4. A graph of the spectral characteristics of green light emitted by an exemplary narrowband green LD could resemble the graph in FIG. 4, but with the emission peak shifted down to ~525 nm. A graph of the spectral characteristics of blue light emitted by an exemplary narrowband blue LD could resemble the graph in FIG. 4, but with the emission peak shifted down to ~455 nm. These are just examples, which are not intended to be limiting.

Figure 2:
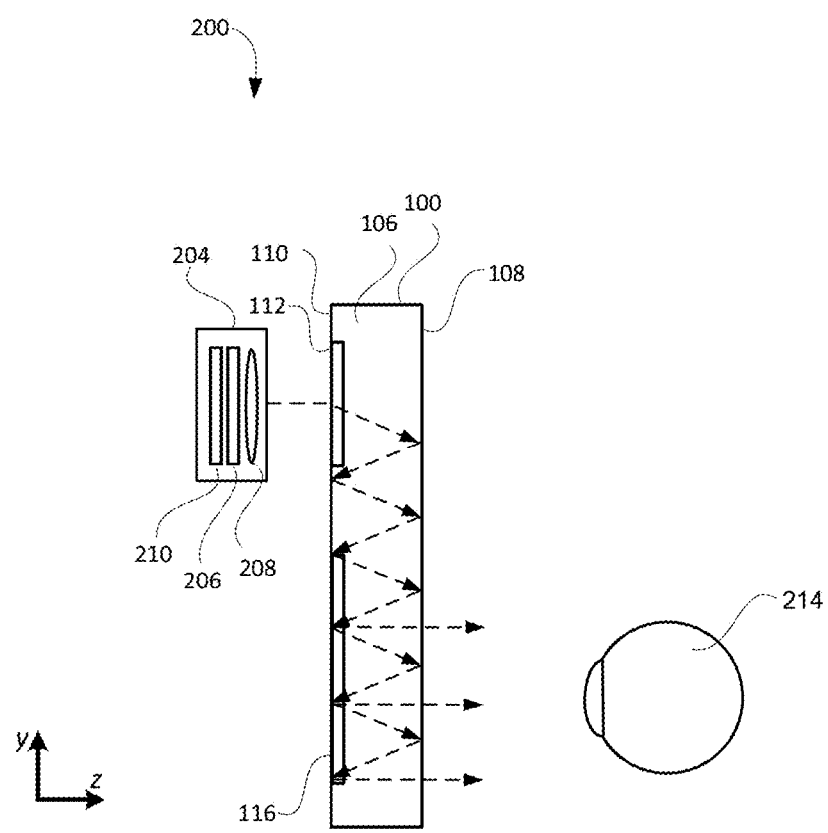
FIG. 2 is side view of the exemplary display system including the waveguide introduced with reference to FIGS. 1A, 1B and 1C, and also shows a display engine that generates an image including angular content that is coupled into the waveguide by an input-coupler, and also shows an eye that is viewing the image within an eye box that is proximate the output-coupler.

The exemplary waveguide 100 shown in and described with reference to FIGS. 1 and 2 is for use in an imaging system that relies on pupil expansion and replication. Such an imaging system can be, e.g., a near eye display system or a heads up display system. In such systems, i.e., systems that rely on pupil expansion and replication, the pupils are preferably uniformly overlapping for all angles and across the output-pupil. When this is not the case, e.g., because pupils are spaced too far apart from one another, angular- and spatial-dependent non-uniformities in intensity arise, which manifest themselves as bright and dark image artifacts, which are undesirable.

Figure 5A:
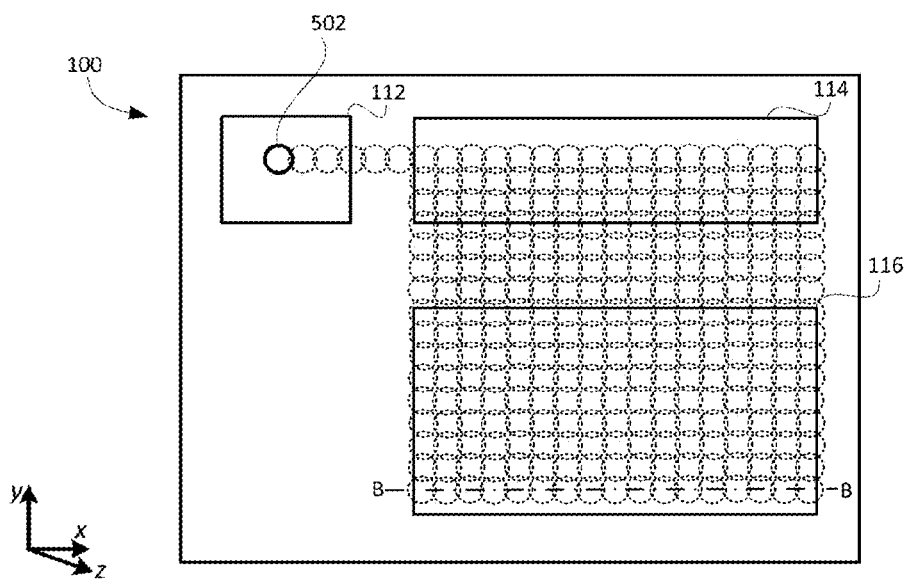
FIG. 5A is used to conceptually illustrate how a pupil is replicated within a waveguide.

FIG. 5A is used to conceptually illustrate how a pupil, represented by the solid-lined circle 502, is replicated, as light travels by way of TIR from the input-coupler 112 to the intermediate-component 114, and by way of TIR from the intermediate-component 114 to the output-coupler 116, where it exits the waveguide 100. In FIG. 5A, each of the dotted-lined circles represents a replication of the pupil 502, which may also be referred to simply as a pupil. While represented as circles in FIG. 5A, each pupil is actually a collection of angles. When light exits the waveguide 100, proximate the output-coupler 116, a human eye, which has a lens in it, receives the collection of angles associated with a pupil and coverts it back to an image, e.g., the image produced by the imaging device 206 of the display engine 204 in FIG. 2. Where the waveguide 100, and more specifically the components 114 and/or 116 thereof is/are configured to perform pupil expansion, then an expanded pupil is converted to an image by the lens of a human eye.

Figure 5B:
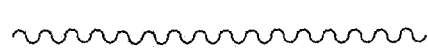
FIG. 5B illustrates an exemplary pupil intensity distribution along the line B-B shown in FIG. 5A.
Figure 5C:
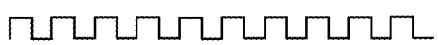
FIG. 5C illustrates an alternative pupil intensity distribution, corresponding to a situation where there is no pupil overlap between pupils replicated within a waveguide.
Figure 5D:
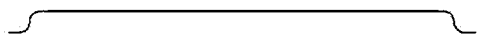
FIG. 5D illustrates a substantially uniform pupil intensity distribution.

FIG. 5B conceptually illustrates an exemplary pupil intensity distribution along the dashed line B-B shown in FIG. 5A, which pupil distribution is shown as having a generally sinusoidal function, due to each pupil have a Gaussian intensity distribution and adjacent pupils only slightly overlapping one another. If the pupils were so spread apart that they did not overlap at all, and each of the pupils had a top-hat intensity distribution, then the pupil intensity distribution can potentially have a square wave function, e.g., as shown in FIG. 5C, although a sinusoidal function (an example of which is shown in FIG. 5B) is more likely. Pupil distributions having a sinusoidal or square wave function will manifest themselves as bright and dark image artifacts, which are undesirable. Optimally, the pupils will overlap one another to achieve a uniform pupil distribution, which provides for a uniform intensity distribution function, as shown in FIG. 5D, which can be achieved, e.g., if there was a 50% overlap between pupils. More generally, there is a desire to homogenize pupil overlap to provide a substantially uniform pupil distribution in the light traveling within the waveguide that is incident on the output-coupler 116.

Figure 6:
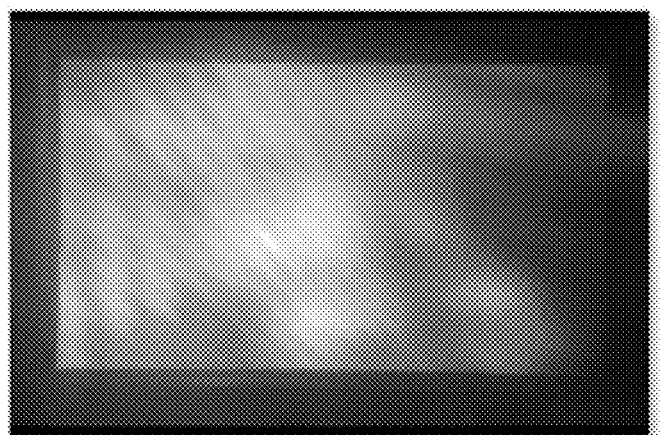
FIG. 6 is used to illustrate non-uniformities in intensities which may occur when performing imaging, and more specifically pupil replication, using an optical waveguide.

FIG. 6 is used to illustrate that non-uniformities in local and global intensity which may occur when performing imaging using an optical waveguide, wherein the non-uniformities can occur due to non-uniform pupil distribution. More specifically, the dark and light generally diagonal fringes are illustrative of non-uniformities in local intensity that occur, at least in part, due to the pupil distribution being non-uniform.

Embodiments of the present technology, which are described below, can be used to provide for a more uniform pupil distribution. More generally, embodiments of the present technology, which are described below, can be utilized to cause the light that is output from a waveguide (e.g., 100) by an output-coupler (e.g., 116) to have a more uniform intensity distribution, so that any non-uniformity in intensity is imperceptible (or at least less perceptible) to a human eye viewing an image using the waveguide.

Referring again to FIG. 2, the dashed line therein can be considered representative of colored visible light (e.g., red light), which after being output by the display engine 104, is incident on the input-coupler 112 of the waveguide 100, travels by way of TIR from the input-coupler to the output-coupler 116, and then exits the waveguide. The colored visible light (e.g., red light) can be produced using a wideband red LED, or a narrowband light source (e.g., a red LD). For reasons already explained above, there are certain advantages to utilizing narrowband light sources, such as LDs. However, the use of narrowband light sources may lead to poor pupil overlap associated with the light traveling through the waveguide by TIR. Such poor pupil overlap can result in a poorly filled output-pupil that manifests as non-uniformities in intensity in the image when viewed from the output-pupil, which is undesirable.

One way to mitigate this problem would be to utilize wideband light sources, instead of narrowband light sources. This is because wideband light sources include spectral energy over a much wider bandwidth (e.g., ~40 nm), which because of chromatic dispersion effects, smear out the dashed line shown in FIG. 2 such that pupil overlap is significantly increased, resulting in a significant improvement in the output-pupil fill. However, as already explained above, there are certain advantages to utilizing narrowband light sources over wideband light sources. Accordingly, where there is a desire to obtain the advantages that narrowband light sources provide over wideband light sources, using wideband light sources is not a satisfactory option.

Certain embodiments of the present technology, which are described below, utilize one or more light sources that include narrow band light emitters in a manner that improves pupil overlap and output-pupil fill. As will be appreciated from the following discussion, such embodiments may achieve these goals by essentially emulating a wideband light source by producing multiple (i.e., two or more) different narrow bands of light that have different respective emission peaks that are within the same color wavelength range. More specifically, in accordance with certain embodiments of the present technology, at least one of the red, green or blue light sources is configured to produce at least two different narrow bands of light that have different respective emission peaks that are within the corresponding wavelength range of the light source. For example, a red light source can include multiple narrowband laser diodes (LDs), each of which produces a different emission peak that is within a red wavelength range from 600 nm to 650 nm. For another example, a green light source can include multiple narrowband LDs, each of which produces a different emission peak that is within a green wavelength range from 500 nm to 550 nm. For still another example, a blue light source can include multiple narrowband LDs, each of which produces a different emission peak that is within a blue wavelength range from 430 nm to 480 nm.

Figure 7:
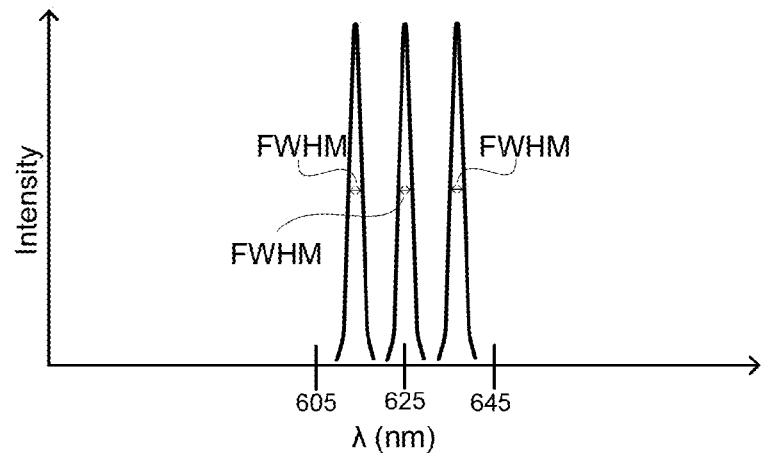
FIG. 7 (which is purposely shown right below FIGS. 4 and 5 so that these FIGS. can be compared to one another) illustrates the spectral characteristics of exemplary emitted red light including three different narrowband emission peaks.

FIG. 7 illustrates exemplary spectral characteristics of red light emitted by a red light source including three narrowband laser diodes (LDs), each of which produces a respective different emission peak that is within the red wavelength range from 600 nm to 650 nm. FIG. 7 is purposely shown below FIGS. 3 and 4, so that the graphs in these FIGS. can be readily compared to one another. Referring to FIG. 7, the red light source used to produce the three different emission peaks shown therein can include, e.g., a first red LD having an emission peak at ~615 nm with a FWHM bandwidth of ~2 nm, a second red LD having an emission peak at ~625 nm with a FWHM bandwidth of ~2 nm, and a third red LD having an emission peak at ~635 nm with a FWHM bandwidth of ~2 nm.

Figure 8:
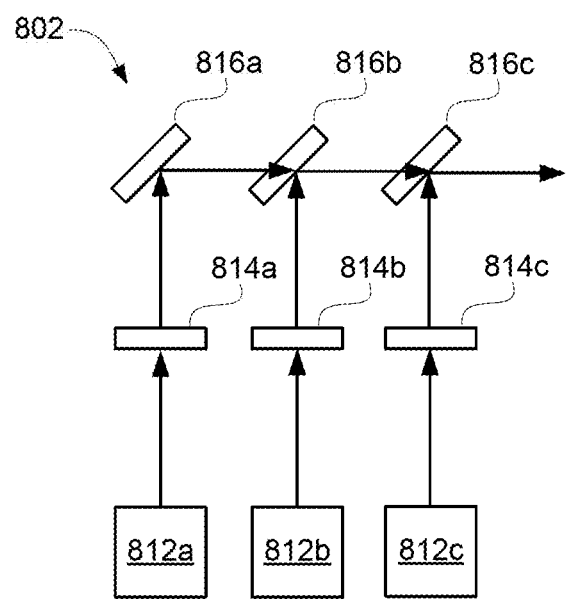
FIG. 8 illustrates one example of a red light source, which can also be referred to as a red light source subassembly, which can be used to produce red light having the spectral characteristics shown in FIG. 7.

FIG. 8 illustrates one example of a red light source 802 that can be used to produce red light having the spectral characteristics shown in FIG. 7. Referring to FIG. 8, the red light source is show as including a first red LD 812a, a second red LD 812b and a third red LD 812c. The first, second and third red LDs 812a, 812b and 812c have emission peaks, respectively, at ~615 nm, at ~625 nm and at ~635 nm, with each having a FWHM bandwidth of ~2 nm, but are not limited thereto.

The red light source 802, which can also referred to as a red light source sub-assembly 802, is also shown as including collimating lenses 814a, 814b and 814c, and dichroic filters 816a, 816b and 816c that are used to combine the red light having different emission peaks into a single beam of red light that has the different emission peaks. Alternative (or additional) beam combining optics, can be used in place of (or in addition to) the dichroic filters 816a, 816b and 816c. The three red LDs 812a, 812b and 812c can, for example, comprise three semiconductor dies that are included in a same semiconductor LD package, or are included in separate semiconductor LD packages. In accordance with an embodiment, the red light source 802 can include three red SLEDs instead of the three red LDs 812a, 812b and 812c. In accordance with another embodiment, the red light source 802 can include three red quantum dot LEDs instead of the three LDs 812a, 812b and 812c. Other variations are possible, and within the scope of embodiments of the present technology described herein.

Figure 9:
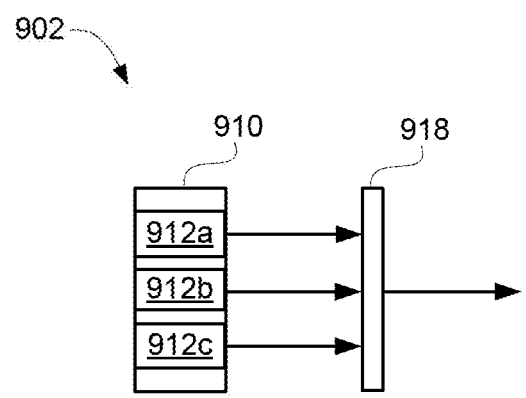
FIG. 9 illustrates another example of a red light source, which can also be referred to as a red light source subassembly, which can be used to produce red light having the spectral characteristics shown in FIG. 7.

FIG. 9 illustrates an example of an alternative red light source 902 that can be used to produce red light having the spectral characteristics shown in FIG. 7. Referring to FIG. 9, the red light source 902 is show as including a multi-stripe laser diode 910 that includes a first red laser stripe 912a, a second red laser stripe 912b and a third red laser stripe 912c, all of which are included in a common semiconductor die. The first, second and third red laser stripes 912a, 912b and 912c produce red light having emission peaks, respectively, at ~615 nm, ~625 nm and ~635 nm, with each having a FWHM bandwidth of ~2 nm, but are not limited thereto. The red light source 902, which can also referred to as a red light source sub-assembly, is also shown as including a collecting lens 918 that is used to combine the red light having different emission peaks into a single beam of red light that has the different emission peaks.

These are just a few examples of how a red light source can be designed to produce red light having the spectral characteristics shown in FIG. 7, and more generally, to produce three different narrow bands of light that have different respective emission peaks that are within the corresponding red wavelength range of the light source from 600 nm to 650 nm. The red light can alternatively include as few as two different narrow bands of light that have different respective emission peaks that are within the corresponding red wavelength range of the light source from 600 nm to 650 nm. In still other embodiments, the red light can alternatively include more than three different narrow bands of light that have different respective emission peaks that are within the corresponding red wavelength range of the light source from 600 nm to 650 nm. More generally, the red light source is configured to produce red light having at least two different narrow bands of light that have respective different emission peaks that are within the red wavelength range. The red light source (e.g., 802 or 902, but not limited thereto), which can also referred to as a red light source sub-assembly, can be part of the light source assembly 210, described above with reference to FIG. 2.

Additionally, or alternatively, a green light source of the light source assembly 210 can be configured to produce at least two different narrow bands of green light that have respective different emission peaks that are within the green wavelength range from 500 nm to 550 nm. Such a green light source can be made in a similar manner as the red light source 802 in FIG. 8, or the red light source 902 in FIG. 9, but is not limited thereto. Such a green light source, which can also referred to as a green light source sub-assembly, can be part of the light source assembly 210, described above with reference to FIG. 2.

Additionally, or alternatively, a blue light source of the light source assembly 210 can be configured to produce at least two different narrow bands of blue light that have respective different emission peaks that are within the blue wavelength range from 430 nm to 480 nm. Such a blue light source can be made in a similar manner as the red light source 802 in FIG. 8, or the red light source 902 in FIG. 9, but is not limited thereto. Such a blue light source, which can also referred to as a blue light source sub-assembly, can be part of the light source assembly 210, described above with reference to FIG. 2.

Dichroic filters, or other beam combiner optics, can be used to combine red, green and blue light beams (produced by red, green and blue light sources) into a single light beam that is provided to the imaging device 206, and the imaging device can use the red, green and blue light to produce an image. In accordance with embodiments of the present technology, at least one of the red, green and blue light sources is configured to produce at least two different narrow bands of light that have respective different emission peaks that are within the corresponding wavelength range of the light source. Examples of how this can be achieved were just described above with reference to FIGS. 7-9.

Advantages of the red light including at least two different narrow bands of light that have respective different emission peaks that are within red wavelength range will now be described with reference to FIG. 10. More specifically, FIG. 10 will be used to explain how certain embodiments of the present technology utilize narrowband light sources in a manner that improves pupil overlap and output-pupil fill. Similar advantages could be achieved if alternatively, or additionally, green light (produced by a green light source) includes at least two different narrow bands of green light that have respective different emission peaks that are within the green wavelength range, and/or the blue light (produced by a blue light source) includes at least two different narrow bands of blue light that have respective different emission peaks that are within the blue wavelength range.

Referring to FIG. 10, the arrowed solid line labelled λR1+λR2+λR3 is representative of the red light portion of the image, produced by the imaging device 206, using the red light produced by the light source assembly 210. More specifically, the arrowed solid line labelled λR1+λR2+λR3 is representative of red light including three different narrow bands of red light that have the respective different emission peaks λR1, λR2 and λR3, where λR1=605 nm, λR2=625 nm, and λR3=645 nm. The red light λR1+λR2+λR3 can be produced, e.g., using the red light source 802 described with reference to FIG. 8, or the red light source 902 described with reference to FIG. 9, but is not limited thereto.

In FIG. 10, the arrowed solid line (labelled λR1+λR2+λR3) is shown as being incident on the input-coupler 112 of the waveguide 100. The waveguide 100 is made of a waveguide material, such as glass or optical plastic. In other words, the waveguide material can be glass or optical plastic, but is not limited thereto. The index of refraction of an optical material, such as the waveguide material, varies with the wavelength of light. Accordingly, the angle of refraction for light entering the waveguide 100 at the input-coupler 112 will depend on the wavelength of the light. In other words, because the index of refraction of a material depends on the wavelength of light, light of different wavelengths travels at different speeds in a particular material, so they will be refracted through slightly different angles inside the material. This is an example of wavelength dependent refraction, which is an effect of chromatic dispersion. Another effect of chromatic dispersion (that can be even more dominant than wavelength dependent refraction) is wavelength dependent diffraction, which causes angular separation of different frequency components of light that interacts with a diffraction grating, or more generally, a diffractive optical element (DOE). Accordingly, if the input-coupler 112 is implemented as a diffractive optical element (e.g., a diffraction grating), the input-coupler 112 will act as a chromatic dispersive element, where each different wavelength shall diffract at slightly different angles when interacting with the diffractive optical element, thus also spreading the pupil distribution at each interaction with the diffractive optical element.

The chromatic dispersion effect caused by a diffraction grating (e.g., the input-coupler 112) can be represented by the following equation:

$$\theta_m = \arcsin((m\lambda/d) - \sin\theta_i)$$

where
  $\theta_m$ is the angle of diffraction,
  m is the diffraction mode (e.g., ±1),
  λ is the wavelength of light (which is a function of n, where n is the index of refraction of the material),
  d is the grating period of the diffraction grating, and
  $\theta_i$ is the incident angle for the light.

This dispersion effect, which is taken advantage of in order to improve output-pupil fill, and more generally, to improve the intensity distribution uniformity in an image viewable at the output-pupil, will occur at every interaction with a diffractive structure. Accordingly, if the output-coupler 116 is implemented as a diffractive optical element (DOE), then the output-coupler 116 will similarly cause the above described dispersion effect. Further, if the waveguide 100 includes the intermediate-component 114, described above (e.g., with reference to FIGS. 1A-1C and 5A), and the intermediate-component 114 is implemented as a diffractive optical element, then the intermediate-component 114 will similarly cause the above described dispersion effect.

Still referring to FIG. 10, the solid line labelled λR1+λR2+λR3 (that is representative of the red light portion of an image) is shown, upon entering the waveguide, as being separated into three separate light beams, represented by a long dashed line labelled λR1, a short dashed line labelled λR2, and a dotted line labelled λR3. The long dashed line labelled λR1 can correspond, for example, to narrowband red light having an emission peak at ~615 nm and a FWHM bandwidth of 2 nm. The short dashed line labelled λR2 can correspond, for example, to narrowband red light having an emission peak at ~625 nm and a FWHM bandwidth of 2 nm. The dotted line labelled λR3 can correspond, for example, to narrowband red light having an emission peak at ~645 nm and a FWHM bandwidth of ~2 nm. The angles at which the λR1 light, the λR2 light and the λR3 light travel within the waveguide differ from one another, due to chromatic dispersion, which was explained above. Specific embodiments of the present technology, which are described herein, take advantage of the chromatic dispersion effect to improve the pupil overlap associated with light traveling within a waveguide, to thereby improve the pupil fill of the output-pupil at which the image is viewed by a human eye. More specifically, by causing red light (and/or green light, and/or blue light) that corresponds to an image to travel by way of TIR through the waveguide (or another optical structure) via two or more different paths, each of which has a different optical path length, multiple pupils corresponding to the red light (and/or green light, and/or blue light) are generated, which improve the pupil overlap associated with light traveling within the waveguide (or another optical structure), and thereby improves the pupil fill corresponding to the output-pupil at which the image is viewed by a human eye.

It is noted that FIG. 10, and the other FIGS., are not drawn to scale. For example, the differences between the angles at which the λR1 light, the λR2 light and the λR3 light travel within the waveguide 100 would likely be smaller than shown in FIG. 10. For another example, as light travels from the input-coupler 112 to the output-coupler 116 by way of TIR, there would likely be many more bounces than shown in FIG. 10.

In the above description, the waveguide 100 was typically described as being a planar waveguide 100 that includes a pair of planar opposing main surfaces. In an alternative embodiment, one or both of the main surfaces of a waveguide could be non-planar, e.g., curved. For example, rather than utilizing a planar waveguide, a freeform waveguide can be used. More generally, the optical structure that is used to cause chromatic dispersion and transfer light corresponding to an image from an input-pupil to an output-pupil, where the image can be viewed by a human eye, can include one or more freeform optical structures.

Figure 11:
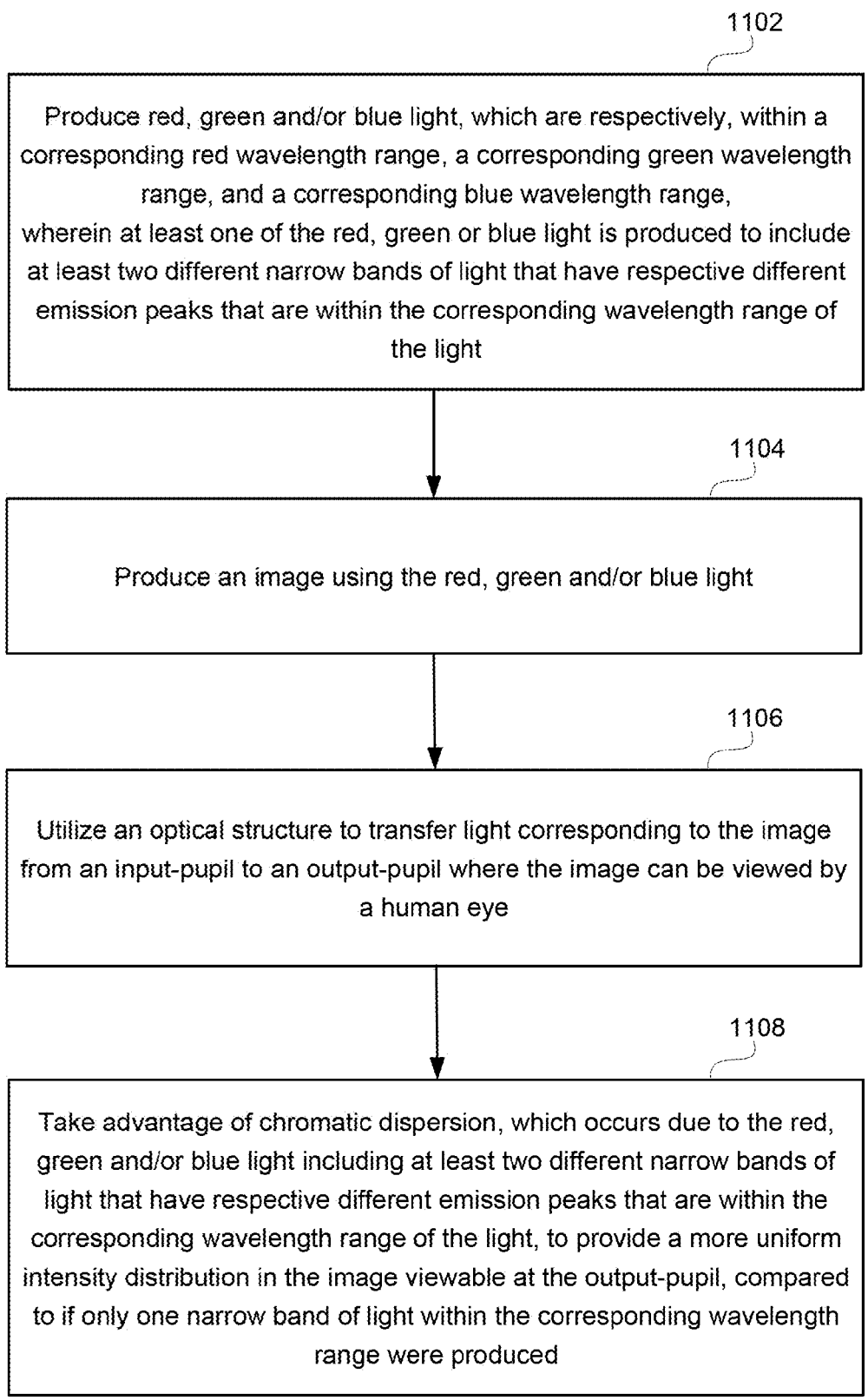
FIG. 11 is a high level flow diagram that is used to summarize methods according to certain embodiments of the present technology.

The high level flow diagram of FIG. 11 will now be used to summarize methods according to certain embodiments of the present technology. Referring to FIG. 11, step 1102 involves producing at least one of red, green or blue light, which are respectively, within a corresponding red wavelength range, a corresponding green wavelength range, and a corresponding blue wavelength range, wherein at least one of the red, green or blue light is produced to include at least two different narrow bands of light that have respective different emission peaks that are within the corresponding wavelength range of the light. The red wavelength range can be from 600 nm to 650 nm, the green wavelength range can be from 500 nm to 550 nm, and the blue wavelength range can be from 430 nm to 480 nn. As noted above, the FWHM of each narrow band of light is less than 10 nm, and is likely to have an FWHM bandwidth of less than 5 nm (e.g., ~2 nm or less). Step 1102 can be performed, e.g., by the light source assembly 210, discussed above. For a more specific example, step 1102 can be performed using a light source that is the same as, or similar to, the light source 802 described with reference to FIG. 8, or the light source 902 described with reference to FIG. 9, but is not limited thereto.

More generally, each one of the red, green or blue light, which is produced to include at least two different narrow bands of light that have respective different emission peaks that are within the corresponding wavelength range of the light, can be produced using at least two light emitter elements each of which produces a separate one of the different narrow bands of light that have different respective emission peaks that are within the wavelength range for the light source. The at least two light emitter elements can be, e.g., at least two stripes of a multi-stripe laser diode included in a common die. In another embodiment, the at least two light emitter elements can be at least two stripes of a multi-stripe super luminescent light emitting diode included in a common die. In still another embodiment, the at least two light emitter elements can be at least two laser diodes included in at least two separate semiconductor dies that may or may not be included in a same semiconductor package. In an alternative embodiment, the at least two light emitter elements can be at least two super luminescent light emitting diodes included in at least two separate semiconductor dies that may or may not be included in a same semiconductor package. In still another embodiment, the at least two light emitter elements can be at least two quantum dot light emitting diodes. Other variations are possible, and within the scope of the embodiments described herein.

Still referring to FIG. 11, step 1104 involves producing an image using the at least one of the red, green or blue light. Step 1104 can be performed, e.g., by the imaging device 206, discussed above. Such an imaging device 206 can utilize DLP technology, LCOS technology, or scanning MEMs display technology, but is not limited thereto.

Still referring to FIG. 11, step 1106 involves utilizing an optical structure to transfer light corresponding to the image from an input-pupil to an output-pupil where the image can be viewed by a human eye. The optical structure can be or include, e.g., one on more optical waveguides, each of which includes one or more diffractive optical elements (DOEs), one or more prims, or one or more other couplers that cause chromatic dispersion. For example, the optical structure can be or include one or more waveguides 100, discussed above. Such an optical structure, as described above, can be used to perform pupil expansion.

Step 1108, which can occur simultaneously with claim 1106, involves taking advantage of chromatic dispersion, which occurs due to the red, green and/or blue light including at least two different narrow bands of light that have respective different emission peaks that are within the corresponding wavelength range of the light, to provide a more uniform intensity distribution in the image viewable at the output-pupil, compared to if only one narrow band of light within the corresponding wavelength range were produced.

Certain embodiments of the present technology, which are described herein, include an optical structure (e.g., one or more waveguides, each of which include one or more diffractive optical elements) to perform pupil replication, wherein overlap of the created pupils are a function of multiple factors including a thickness of the optical structure (e.g., the waveguide(s)), the design of diffraction grating structures, the size of an entrance pupil and the frequency bandwidth of the light source(s). If the frequency bandwidth of a light source includes a single narrow bandwidth, then the pupil overlap would be poor, which would make it difficult or ineffective to use a narrow bandwidth light source (e.g., a laser diode or super luminescent LED) with these types of optical structures (e.g., waveguides). In accordance with certain embodiments, light with multiple narrow band peaks of emission are used to create multiple pupils, rather than single peak narrow band light. Such multiple narrow bands having different frequency emission peaks take advantage of a dispersion effect not present with a single narrow band of light having a single frequency peak of emission. The dispersion effect causes the different wavelengths to propagate at slightly different angles within the waveguide and improve the overlap of the pupil.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A near eye or heads up display system, comprising:
    a light source assembly including red, green and blue light sources that are configured to respectively produce red light within a corresponding red wavelength range, green light within a corresponding green wavelength range and blue light within a corresponding blue wavelength range, wherein at least one of the red, green or blue light sources is configured to produce at least two different narrow bands of light that have respective different emission peaks that are within the corresponding wavelength range for the light produced by the light source;

an imaging device configured to produce an image using the red, green and blue light produced by the light source assembly; and an optical structure including one or more diffractive optical elements and configured to transfer light corresponding to the image, which includes the at least two different narrow bands of light that have respective different emission peaks that are within the corresponding wavelength range, from a common input-pupil to a common output-pupil.

2. The system of claim 1, wherein the optical structure is also configured to perform pupil expansion.

3. The system of claim 1, wherein:
for each said light source that is configured to produce at least two different narrow bands of light that have respective different emission peaks that are within the wavelength range for the light source, the at least two different narrow bands of light provide a more uniform intensity distribution in the image viewable at the output-pupil compared to if only one narrow band of light within the wavelength range for the light source were produced.

4. The system of claim 1, wherein at least one said light source, that is configured to produce at least two different narrow bands of light that have respective different emission peaks that are within the wavelength range for the light source, comprises:
at least two light emitter elements each of which produces a separate one of the different narrow bands of light that have different respective emission peaks that are within the wavelength range for the light source.

5. The system of claim 4, wherein the at least two light emitter elements comprise:
at least two stripes of a multi-stripe laser diode included in a common die;
at least two stripes of a multi-stripe super luminescent light emitting diode included in a common die;
at least two laser diodes included in at least two separate semiconductor dies that may or may not be included in a same semiconductor package;
at least two super luminescent light emitting diodes included in at least two separate semiconductor dies that may or may not be included in a same semiconductor package; or
at least two quantum dot light emitting diodes.

6. The system of claim 1, wherein for each said light source that is configured to produce at least two different narrow bands of light that have respective different emission peaks that are within the wavelength range of the light source, a maximum difference in wavelengths between two of the different emission peaks is 50 nm.

7. The system of claim 1, wherein:
the red wavelength range is from 600 nm to 650 nm;
the green wavelength range is from 500 nm to 550 nm; and
the blue wavelength range is from 430 nm to 480 nm.

8. The system of claim 1, wherein a full width half maximum (FWHM) of each of the narrow bands of light is less than 10 nm.

9. The system of claim 1, further comprising:
beam combiner optics configured to combine one or more beams of light produced by one or more of the red, green and blue light sources, or light emitter elements thereof, prior to the beams being provided the imaging device.

10. The system of claim 1, wherein at least one of the red, green or blue light sources is configured to produce at least three different narrow bands of light that have respective different emission peaks that are within the corresponding wavelength range for the light source.

11. The system of claim 1, wherein the optical structure comprises an optical waveguide, the optical waveguide including:
an input-coupler configured to couple light corresponding to the image into the optical waveguide; and
an output-coupler configured to couple the light corresponding to the image, which travels in the optical waveguide from the input-coupler to the output-coupler, out of the waveguide so that the light is output and imaged from the output-pupil; and
wherein the input-coupler comprises a said diffractive optical element; and
wherein output-coupler is configured to perform one of horizontal or vertical pupil expansion.

12. The system of claim 11, wherein:
the waveguide further comprises an intermediate component;
the input-coupler is configured to direct light coupled into the waveguide toward the intermediate-component; and
the intermediate-component is configured to perform the other one of horizontal or vertical pupil expansion and to direct the light
corresponding to the image towards the output-coupler;
wherein at least one of the intermediate-component or the output coupler comprises a said diffractive optical element.

13. A method, comprising:
producing one or more of red, green or blue light, which are respectively, within a corresponding red wavelength range, a corresponding green wavelength range, and a corresponding blue wavelength range,
wherein at least one of the one or more of red, green or blue light is produced to include at least two different narrow bands of light that have respective different emission peaks that are within the corresponding wavelength range of the light;
producing an image using the one or more of red, green or blue light;
utilizing an optical structure to transfer light corresponding to the image from an input-pupil to an output-pupil; and
taking advantage of chromatic dispersion, which occurs due to the at least one of the red, green or blue light including at least two different narrow bands of light that have respective different emission peaks that are within the corresponding wavelength range of the light, to provide a more uniform intensity distribution in the image viewable at the output-pupil, compared to if only one narrow band of light within the corresponding wavelength range were produced.

14. The method of claim 13, wherein the utilizing the optical structure also includes utilizing the optical structure to perform pupil expansion.

15. The method of claim 13, wherein:
the red wavelength range is from 600 nm to 650 nm;
the green wavelength range is from 500 nm to 550 nm;

the blue wavelength range is from 430 nm to 480 nn;

a full width half maximum (FWHM) of each of said narrow band of light is less than 10 nm, and a maximum difference in wavelengths between two of the different emission peaks, within a same corresponding wavelength range of the light, is 50 nm.

16. The method of claim 13, wherein each one of the red, green or blue light, which is produced to include at least two different narrow bands of light that have respective different emission peaks that are within the corresponding wavelength range of the light, is produced using at least two light emitter elements each of which produces a separate one of the different narrow bands of light that have different respective emission peaks that are within the wavelength range for the light source.

17. The method of claim 16, wherein the at least two light emitter elements comprise:
   at least two stripes of a multi-stripe laser diode included in a common die;
   at least two stripes of a multi-stripe super luminescent light emitting diode included in a common die;
   at least two laser diodes included in at least two separate semiconductor dies that may or may not be included in a same semiconductor package;
   at least two super luminescent light emitting diodes included in at least two separate semiconductor dies that may or may not be included in a same semiconductor package; or
   at least two quantum dot light emitting diodes.

18. A near eye or heads up display system, comprising:
   a light source that is configured to produce at least two different narrow bands of light within a same color wavelength range, wherein the color wavelength range comprises one of a red wavelength range, a green wavelength range or a blue wavelength range;
   an image former configured to produce an image using the at least two different narrow bands of light within the same color wavelength range produced by the light source; and
   an optical waveguide including an input-coupler and an output-coupler that are each configured to cause chromatic dispersion;
   wherein the input-coupler is configured to couple light corresponding to the image, which includes the at least two different narrow bands of light within the same color wavelength range, into the optical waveguide;
   wherein the output-coupler is configured to couple light corresponding to the image, that includes the at least two different narrow bands of light within the same color wavelength range, and that has traveled within the waveguide from the input-coupler to the output-coupler, out of the optical waveguide;
   wherein a full width half maximum (FWHM) of each said narrow band of light is less than 10 nm.

19. The system of claim 18, wherein the input-coupler and the output-coupler are each implemented as a prism or a diffractive optical element.

20. The system of claim 18, wherein the light source comprises at least two light emitter elements, each of which produces a separate one of the different narrow bands of light that have different respective emission peaks that are within the color wavelength range for the light source.

* * * * *